Aug. 15, 1967  T. M. JONES  3,335,486
VALVE SEAT EXTRACTOR
Filed July 30, 1964  3 Sheets-Sheet 1

INVENTOR.
THOMAS M. JONES
BY

AGENT

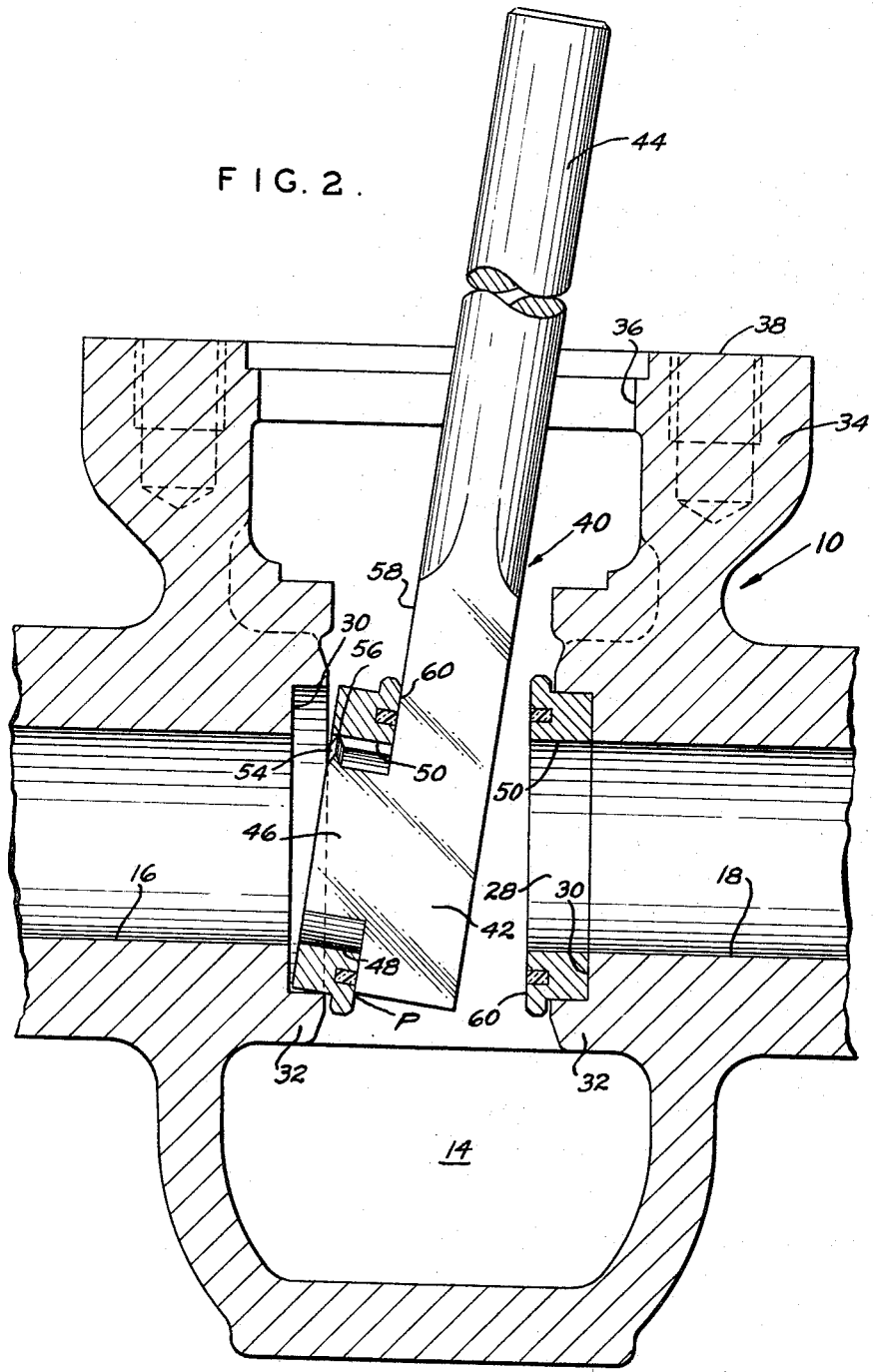

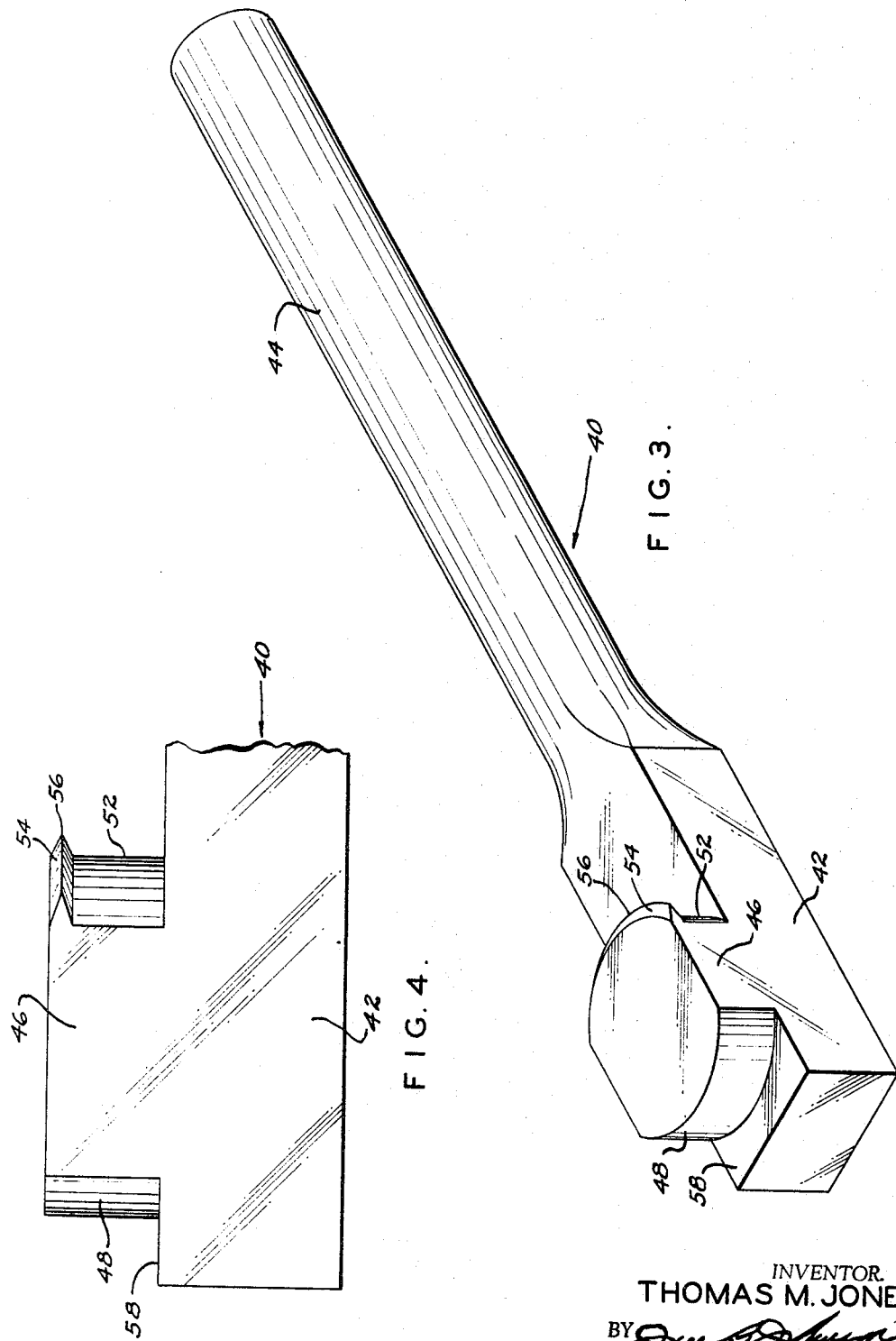

United States Patent Office 3,335,486
Patented Aug. 15, 1967

3,335,486
VALVE SEAT EXTRACTOR
Thomas M. Jones, Houston, Tex., assignor to ACF Industries, Incorporated, New York, N.Y., a corporation of New Jersey
Filed July 30, 1964, Ser. No. 386,215
4 Claims. (Cl. 29—213)

This invention relates generally to the servicing of valves and more specifically to a hand operated tool for extracting press-fitted seats from the seat recesses of a valve.

Valves for controlling flow of fluid in fluid processing industries or fluid transportation industries have long presented costly production problems when repair of the valves becomes necessary because of leakage due to seat wear or to packing wear. In processing industries, such as petroleum refineries, it frequently becomes necessary to shut down a complete unit of the refinery merely to replace or to repair a leaking valve. Repairs on valves in systems of this nature involve considerable production losses occasioned by the cost of shutting down and restarting the process, as well as production losses resulting from down time on the system.

In the petroleum industry particularly, high-speed pipelines have been installed for transporting crude oil, natural gas, etc., from one locality to another. These pipelines may be used to transport fluid at the rate of several thousand barrels per hour. Down time on pipelines of this type for repair can become extremely costly because of the production losses involved.

Two general types of valve repair are overhaul repair, where the valve is completely removed from the line for the repair operation, and field repair, where the valve is repaired in place. When overhauling a valve, generally the valve to be repaired will be removed from the line and a replacement valve will be installed in its place so that the line may be put back into service as quickly as possible. The valve needing repair will then be shipped to a valve repair center or will be shipped to the factory of its manufacture for repair by specially trained valve personnel. All of the moving parts of the valve will generally be replaced and the valve will be restored to near new condition for further service. A number of problems occur when the valve must be removed from the line for repair. The valve, especially if it is a large valve, will frequently be welded in place in the line and, therefore, must be cut out of the line and a new valve must be welded in its place to put the line back in service. When the line is utilized for transportation of flammable fluids, such as crude oil, natural gas, gasoline, and the like, the use of flame such as that produced by an oxyacetylene cutting torch can be extremely hazardous, thus requiring the use of special equipment, personnel, and special removal techniques. Other problems occur when the valve to be repaired is located in a relatively inaccessible area because of the special equipment generally needed for replacement repair. If the valve is positioned beneath or partially beneath the surface of the ground, which is frequently the case, earth removal equipment must be moved to the valve site to aid in gaining access to the valve and removing the valve after it has been separated from the line.

The second type of valve repair, generally known as field repair, is accomplished whenever possible to reduce down time on the line to prevent excessive production losses. Field repair, such as replacement of the valve stem packing, replacement of the valve seats, and replacement of the gate or other valve element may be done while the valve is positioned in the line.

Field repair involving the removal or replacement of press-fitted seat assemblies in the valve requires that the valve be opened, such as by removing the bonnet assembly from the valve to gain access to the valve seats. The press-fitted seats, due to manufacturing tolerances, frequently have an extremely tight press-fit with the seat recess thereby requiring considerable effort to remove the same from the valve. Historically, press-fitted seats have been removed by striking the same with hammer and chisel or other driving tool to drive the seats out of the seat recesses. One disadvantage of this method of seat removal is that a valve repairman using a driving tool to remove the seats may work for an hour or more before a single seat is driven out of its recess. Another disadvantage is that the valve repairman may be subjected to toxic or otherwise dangerous fumes over long periods of time as he reaches into the valve cavity to gain access to the seats. When the line has been used for flammable fluids, such as gasoline or crude oil, this type of repair service becomes hazardous not only because of the fumes present, but also because of the danger to the repairman in case of explosion which might be caused by sparks from the driving or striking tools.

It is, therefore, a primary object of this invention to provide a novel seat extracting tool for removing press-fitted seats from a valve which eliminates the need for the operator to be subjected to fumes from the fluid controlled by the valve for extended lengths of time.

It is a further object of this invention to provide a novel seat extracting tool which is effective in operation and which will not damage either the seat or the seat recess.

An even further object of this invention contemplates the provision of a novel tool for removing press-fitted seats from valves which is lightweight, portable and which can be easily transported to remote valve sites and operated by a single valve repairman.

It is an even further object of this invention to provide a novel tool for removing press-fitted seats from a valve which is economical in manufacture and also reliable in use.

Other and further objects of this invention will be obvious upon an understanding of the illustrated embodiment about to be described, or will be indicated in the appended claims, and various advantages not referred to herein will occur to one skilled in the art upon employment of the invention in practice. A preferred embodiment of the invention has been chosen for the purpose of illustration and description and is shown in the accompanying drawings forming a part of the specification wherein:

FIGURE 2 is an elevational view in section of the valve body of FIGURE 1, illustrating extraction of the seat assembly.

FIGURE 3 is a perspective view of the invention of FIGURE 1.

FIGURE 4 is a partial side elevational view of the invention of FIGURE 3.

Figure 1:
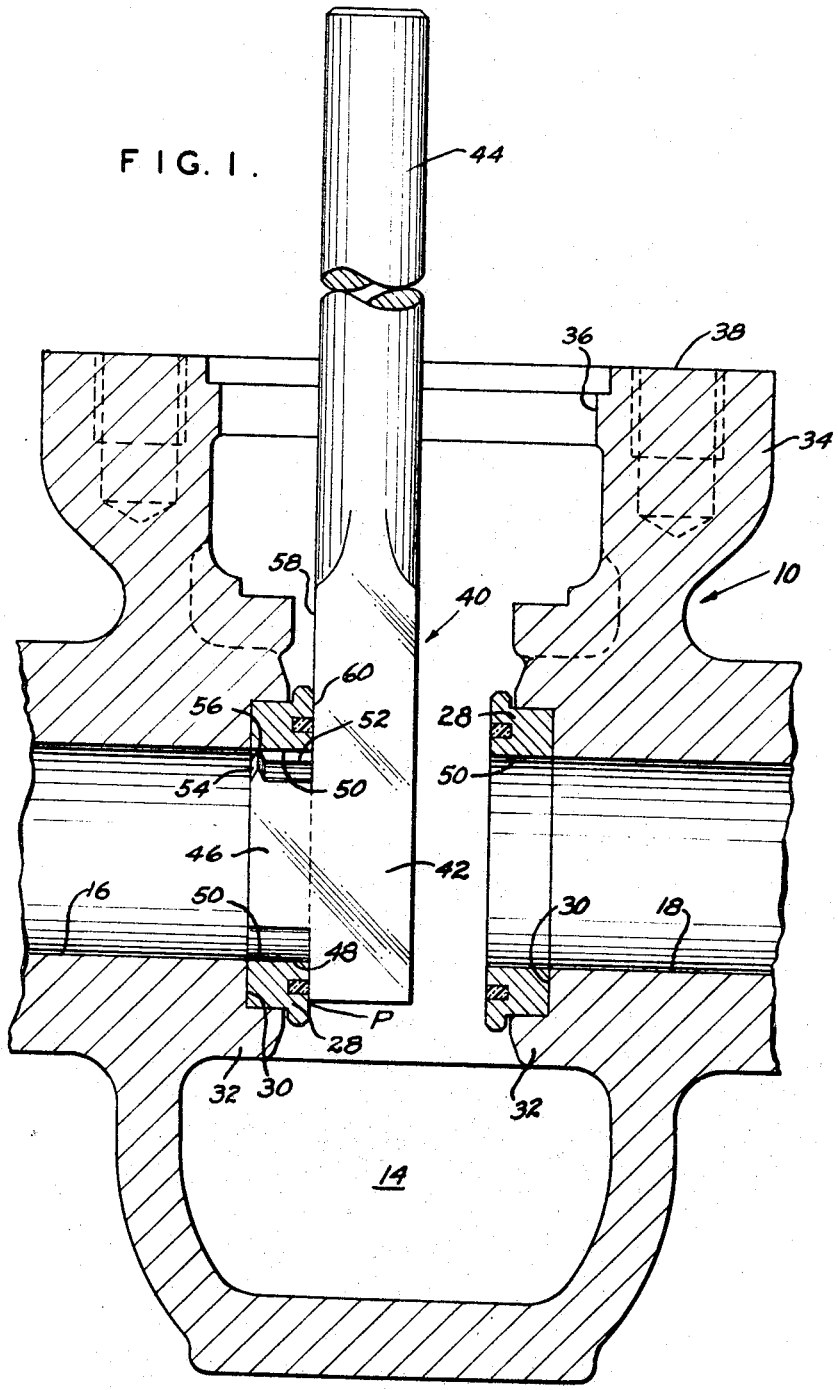
FIGURE 1 is an elevational view in section of a valve having its bonnet assembly removed and having the invention positioned in operative position within the seat ring.

Briefly, the invention concerns a tool for removing press-fitted seat rings from a valve and which can be manually operated by a valve repairman. The tool is adapted for insertion into the valve chamber of the valve and into operative engagement with the valve seat of the valve. The tool, upon being pivoted in a predetermined direction, becomes locked within the valve seat member and continued movement of the tool in the predetermined direction causes the seat member to be extracted from the valve seat recess.

Referring now to the drawings for a better understanding of the invention, a valve body 10 is illustrated in FIGURE 1, which is formed with a valve chamber 14 and having a pair of aligned flow passages 16 and 18 disposed in communication with the valve chamber 14. A pair of identical seat assemblies 28 are press-fitted into seat recesses 30 formed in annular bosses 32, which extend into the valve chamber 14 and which surround the flow passages 16–18. An annular flange portion 34 formed integrally with the valve body 10 defines an opening 36 and a annular bolt circle 38 for receiving a bonnet assembly and a gate assembly, not shown.

In accordance with the invention, a seat extracting tool 40 is provided for removing the press-fitted valve seats 28 from their recesses 30. The seat extracting tool 40 comprises a head portion 42 and an elongated handle portion 44. The handle 44 is formed to fit the hand of the valve maintenance personnel.

The head portion 42 of the seat extracting tool 40 has a partially cylindrical boss 46 integral therewith and extending generally normal thereto. A partially cylindrical surface 48 is formed on the boss 46 and is adapted to engage the inner peripheral surface 50 of the valve seat 28. A second partially cylindrical surface 52 is formed on the boss 46 and opposes the cylindrical surface 48. A curved seat engaging tooth 54 is fixed to the cylindrical surface 52 by welding or the like, and is adapted to engage the inner peripheral surface 50 of the valve seat 28. The tooth 54 is preferably formed of an extremely hard metal composition, such as any of various commercially available alloys of steel, being much harder than the metal from which the valve seat 28 is formed. The boss 46 is of substantially the same length as the cross sectional dimension of the valve seat 28, so that the boss extends substantially the full length of the valve seat 28, as illustrated in FIGURES 1 and 2. The curved tooth 54 is disposed adjacent the free extremity of the annular surface 52 on the boss 46, so that it engages the inner peripheral surface 50 of the valve seat 28 adjacent the innermost portion thereof. The annular tooth 54 has a generally triangular cross section as illustrated in FIGURE 4, presenting a sharp partially circular edge 56 for contact with the inner peripheral surface 50 of the valve seat 28. The triangular cross sectional shape of the tooth lends structural support to the tooth to prevent breaking of the tooth during the seat removal operation.

In operation the seat extracting tool 40 is placed within the valve chamber 14 of the valve 10 as illustrated in FIGURE 1, and is positioned relative to the seat member 28 in such a manner that the boss 46 and annular tooth 54 extend well into the bore 50 of the seat assembly 28. In this position a substantially planar surface 58 on the seat extracting tool 40 will be brought into intimate contact with the sealing face 60 of the seat member 28. The operator then grasps the handle 44 of the seat extracting tool 40 and applies a force tending to rotate the handle 44 in a direction generally axially of the flow passages 16 and 18. Rotation of the handle 44 of the tool 40 will cause the boss 46 to pivot about a point P located on the sealing face 60 of seat ring 28. This pivotal action will cause the sharp edge 56 of the seat extracting tool 40 to move in an arc about the pivot point P and thereby to be brought into tight engagement with the inner peripheral surface 50 of the seat 28. Continued movement of the sharp curved edge 56 about the pivot point P will cause the edge 56 to dig slightly into the inner peripheral surface 50 of the valve seat 28 and thereby cause binding between the seat 28 and the seat extracting tool 40. As rotation of the handle 44 of the seat extracting tool 40 is further continued about the pivot point P, the press-fit between the seat ring 28 and the seat recess 30 will be overcome and the seat 28 will pivot out of its seat recess 30. The seat extracting tool 40 is then lifted outwardly of the valve chamber 14 by the operator and the seat 28, which will remain positioned on the boss 46, will be lifted out of the valve chamber with the seat extracting tool. Extraction of the remaining seat 28 in the valve will be accomplished in a like manner.

From the foregoing it is seen that I have provided a novel tool for extracting press-fitted seats from the seat recesses of a valve which is easily transported and operated by a single valve repairman to quickly remove press-fitted seats from a valve with a minimum of effort. Since the invention is operated from the exterior of the valve there is no need for the operator to be subjected to fumes which might issue from the valve or to be subjected for extended lengths of time to the hazard of explosion. The invention requires no pounding or striking such as would occur when seats are driven out of their seat recesses with hammer or chisel or other driving tools, thereby reducing the possibility of striking a spark and accordingly reducing the possibility of explosion. The seat extracting tool of this invention is extremely light in weight and may be transported by hand to the valve repair site with a minimum of effort. The invention is also inexpensive in manufacture as well as being reliable in use. The invention, therefore, is one well adapted to attain all of the objects hereinabove set forth together with other advantages which are obvious and inherent from a description of the apparatus itself.

As many possible embodiments may be made of the invention without departing from the scope thereof, it is to be understood that all matter herein set forth or shown in the accompanying drawings is to be interpreted as illustrative and not in a limiting sense.

I claim:

1. A tool for extracting press-fitted valve seat rings from the seat recesses of a valve, comprising an elongated handle having a tool head formed integrally thereon, said tool head having a boss extending therefrom in substantially normal relation thereto, a pair of opposed surfaces formed on the boss in substantially normal relation to said elongated handle, one of the surfaces adapted to engage the inner peripheral surface of a valve seat ring, a tooth disposed on the other of said surfaces adjacent the free extremity thereof and adapted to frictionally engage the inner peripheral surface of the seat ring to be extracted to prevent pivoting of the boss within the seat ring in a predetermined direction and to cause the seat ring to be pivoted out of its seat recess upon pivoting the handle in said predetermined direction.

2. A tool for extracting press-fitted valve seats from the seat recesses of a valve, comprising an elongated handle adapted to fit the hand of the user, a tool head on the handle and having a boss extending therefrom in substantially normal relation with said handle, a pair of opposed curved seurfaces formed on the boss, one of the surfaces adapted to engage the inner peripheral surface of a press-fitted valve seat, an annular tooth disposed on the other of said surfaces adjacent the free extremity thereof and adapted to frictionally engage the inner peripheral surface of the seat to prevent pivoting of the boss within the seat in a predetermined direction and to cause the seat to be pivoted out of its seat recess upon pivoting the handle in said predetermined direction.

3. A tool for extracting press-fitted valve seat rings from the seat recesses of a valve, comprising an elongated handle adapted to fit the hand of the user, a tool head formed integrally with the handle and having a boss extending therefrom disposed substantially normal to the longitudinal axis of the handle, a pair of partially cylindrical surfaces formed on the boss and extending substantially normal to the handle, one of the partially cylindrical surfaces adapted to engage the inner peripheral surface of a valve seat ring, an annular tooth disposed on the other of said partially cylindrical surfaces adjacent the free end thereof and adapted to frictionally engage the inner peripheral surface of the seat to prevent pivoting of the boss within the seat ring in a predetermined direction to cause the seat ring to be pivoted out of its seat recess upon pivoting the handle in said predetermined direction.

4. A tool for extracting press-fitted valve seat rings from the seat recesses of a valve, comprising an elongated handle adapted to fit the hand of the user, a tool head on the handle and having a boss extending therefrom disposed substantially normal to the longitudinal axis of the handle, a pair of opposed curved surfaces formed on the boss and extending substantially normal to the handle, one of the curved surfaces adapted to engage the inner peripheral surface of a valve seat ring and to define a pivot point with the seat ring, an annular tooth formed of extremely hard material disposed on the other of said curved surfaces adjacent the free end thereof and adapted to frictionally engage the inner peripheral surface of the seat adjacent the inner extremity thereof to prevent pivoting of the boss within the seat ring in a predetermined direction and to cause the seat ring to be pivoted out of its seat recess upon pivoting the handle in said predetermined direction.

References Cited

UNITED STATES PATENTS

| | | | |
|---|---|---|---|
| 780,727 | 1/1905 | Pendergast. | |
| 2,623,276 | 12/1952 | Anderson | 29—265 |
| 2,775,540 | 7/1956 | Crozier | 29—265 |
| 2,889,618 | 6/1959 | Morris et al. | 29—267 |
| 2,961,756 | 11/1959 | Johnson | 29—282 X |

FOREIGN PATENTS

| | | |
|---|---|---|
| 821,421 | 10/1959 | Great Britain. |

WILLIAM FELDMAN, *Primary Examiner.*

J. C. PETERS, *Assistant Examiner.*